United States Patent [19]
Heitmann et al.

[11] 3,900,264
[45] Aug. 19, 1975

[54] ELECTRO-OPTICAL STEP MARKER
[75] Inventors: Knut Heitmann; Eckart Schneider, both of Wetzlar, Germany
[73] Assignee: Ernst Leitz G.m.b.H., Wetzlar, Germany
[22] Filed: June 19, 1973
[21] Appl. No.: 371,473

[30] Foreign Application Priority Data
June 20, 1972  Germany............................ 2229996

[52] U.S. Cl................ 356/111; 350/162 R; 356/110
[51] Int. Cl.².......................................... G01B 9/02
[58] Field of Search......... 356/111, 110; 350/162 R; 250/237 G

[56]  References Cited
UNITED STATES PATENTS

| | | | |
|---|---|---|---|
| 3,216,315 | 11/1965 | Keller............................ | 350/162 R X |
| 3,281,110 | 12/1973 | Leitz et al.................... | 250/237 G X |
| 3,419,330 | 12/1968 | Schneider................... | 350/162 R X |
| 3,493,959 | 2/1970 | Cap............................... | 350/162 R X |
| 3,726,595 | 4/1973 | Matsumoto.................. | 356/111 |

Primary Examiner—Ronald L. Wibert
Assistant Examiner—Matthew W. Koren
Attorney, Agent, or Firm—Gilbert L. Wells

[57] ABSTRACT

In an interferometric electro-optical step marker comprising a code trace constructed like a diffraction grating the diffraction orders are caused to interfere with one another in pairs in order to generate periodically varying measurement signals. The diffraction grating is so constructed that as a consequence of its line pattern at least one diffraction order of a higher number, preferably $\geq 3$, receives clearly more light in comparison to the remaining diffraction orders. The combination of such diffraction orders with higher numbers results in a higher Doppler frequency, whereby the mechanically ruled grating interval is electro-optically subdivided.

6 Claims, 5 Drawing Figures

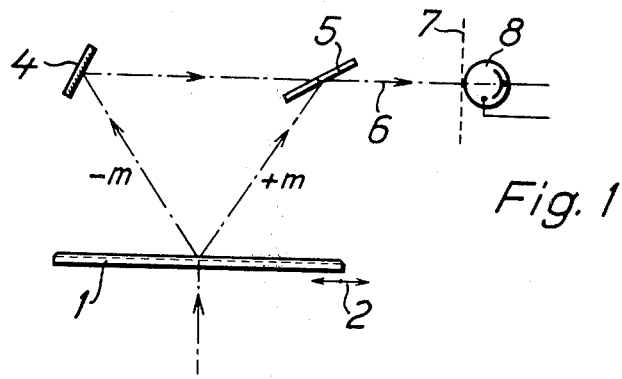
Fig. 1
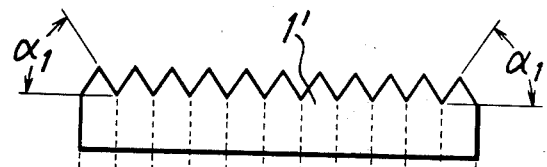
Fig. 2a
Fig. 2b
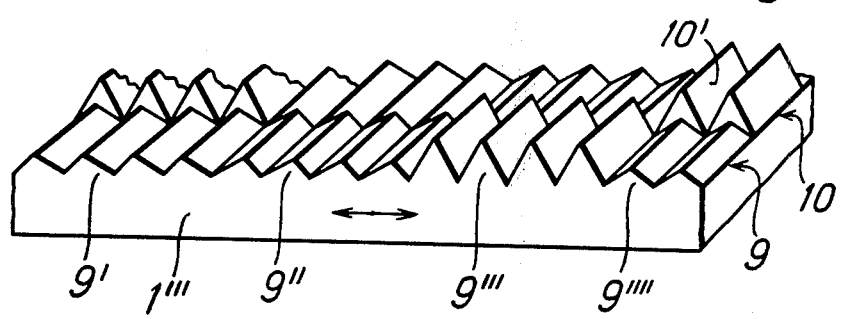
Fig. 2c
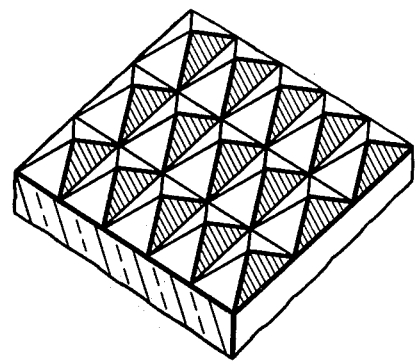
Fig. 2d

ELECTRO-OPTICAL STEP MARKER

BACKGROUND OF THE INVENTION

The present invention relates to an apparatus for measuring a property of movement, more particularly to an electro-optical step marker comprising a diffraction grating.

In an interferometric electro-optical angle step marker, a laser beam is concentrated in a small spot on a code trace constructed like a diffraction grating. From the diffraction pattern thereby obtained, by means of small plane mirrors suitable pairs of components are so combined with one another, that the interference line pattern obtained on a photo-electric step marker generates a correspondingly periodically varying measurement signal at the receiver output upon movement of the code trace, in consequence of the continuous phase displacement between the components. Since the combination of diffraction components with a higher difference in their order numbers leads to a correspondingly higher Doppler frequency, a mechanically ruled grating interval may thus electro-optically be subdivided.

In the case of a diffraction grating (a transmission or a reflection grating) with a line profile shaped like a stair, the diffracted light may be concentrated almost completely in one diffraction order by letting the deflection by refraction or reflection at the lines coincide with the deflection by diffraction (blaze deflection). Thereby, in particular in the case of symmetrical diffraction order sets (order numbers $+m$, $-m$) the one order is considerably preferred energetically in relation to the other. It is the particular object of the invention to provide a step marker which is improved with regard to the exactness of its measurement and to the quality of its signals.

SUMMARY OF THE INVENTION

According to the present invention, there is provided an apparatus including a diffraction grating suitable for measuring a property of movement of the grating relative to a beam of radiation with reference to at least one coordinate axis, the grating defining at least one set of two diffraction orders other than the zero diffraction order, which are energetically preferred to other diffraction orders, the apparatus further comprising means to cause radiation of one of the diffraction orders of one set to interfere with radiation of the other one of the diffraction orders of the respective set, and detecting means to receive said interfering radiation and to generate electrical signals indicative of the property of movement.

Suitably the modulus of each of the two order numbers of one set of diffraction orders is at least equal to 3.

Preferably the order numbers of the two diffraction orders of one set have the same modulus and mutually opposite sign.

Conveniently, the grating comprises a plurality of pyramidal diffracting elements, and preferably the grating defines at least one individual set of two preferred diffraction orders associated with each respective one of a plurality of co-ordinate axes, the order number of the preferred diffraction orders associated with each individual co-ordinate axis being different from the order numbers of the diffraction orders associated with the other or each respective coordinate axis.

The grating may have a uniform grating constant over the whole of the surface of the grating, individual portions of the surface of the grating defining respectively different sets of two preferred diffraction orders associated with the same co-ordinate axis.

BRIEF DESCRIPTION OF THE DRAWINGS

The invention will be more readily comprehended from the following description when taken in conjunction with the appended drawings, wherein:

FIG. 1 shows the construction of an embodiment of a photo-electric step marker according to the invention; and FIGS. 2a, 2b, 2c and 2d show embodiments of the diffraction grating.

DESCRIPTION OF THE PREFERRED EMBODIMENTS

In FIG. 1 a diffraction grating 1 is shown, the displacement of which in the directions shown by a double arrow 2 is to be determined photo-electrically. For this purpose, the grating is illuminated from below with parallel light. In consequence of its blaze structure, explained in greater detail below, the grating 1 deflects the incident light flux predominantly into the set of two preferred high diffraction orders $+m$ and $-m$. The light of the order $-m$, after reflection at a deflecting mirror 4, is combined and caused to interfere with the light of the order $+m$ by means of a beam combiner 5. The interference pattern set up in a plane 7 by the combined ray bundle 6 is scanned by a photo-electric detector 8.

The operation of the described apparatus is as follows: In consequence of diffraction at the grating 1, the light fluxes of the orders $+m$ and $-m$ receive direction components orientated parallel to the grating displacement direction, which are the greater, the higher is the order number m and thus the deflection angle. Correspondingly to the amount and sign of these direction components, the diffracted light upon movement of the grating 1 experiences a Doppler displacement of its wavelength, which in the case shown is of opposite sign but equally large for the orders $+m$ and $-m$ having order numbers of the same modulus and mutually opposite sign. However, sets of two diffraction orders with order numbers of different moduli may, if desired, be brought to interference. It is preferable that the moduli of the order numbers of the preferred orders should be at least equal to 3. Thus the brightness of the interference pattern in the plane 7 alters with a frequency directly proportional to the generated wavelength difference, while the position of the orders on the other hand remains unaltered. At the photoelectric detector 8 there is then obtained an electrical measurement signal proportional to the brightness.

The embodiments 1' and 1", shown in FIGS. 2a and 2b, of the diffraction grating 1 have equal grating constants, but different blaze structures. The refracting angle $\alpha_1$ of the transmitted-light phase grating 1' of FIG. 2a is chosen to be greater than the corresponding angle $\alpha_2$ of the grating 1" of FIG. 2b. Therefore, in the case of the grating 1' the symmetrically positioned, energetically considerably preferred diffraction orders are higher than those of the grating 1". For the reasons set out above, therefore a step marker with the grating 1' delivers a higher number of steps per unit displacement distance than such a marker with the grating 1″, and thus a finer interpolation at an equal grating constant is obtained.

In FIG. 2c there is schematically shown an embodiment of the diffraction grating, which, at constant graduation interval, is equipped at different sections of its surface with different line geometry in such a manner, that different diffraction orders are preferred and so represent a means of identification. Differently graduated parts 9′, 9″ and so on are arranged side by side in the front row 9 on a carrier 1‴. In the front row there is beginning from the left, a line structure 9′, which is asymmetric and the roof edges of which are displaced towards the left. This structure energetically prefers for example the −5 and the +3 diffraction orders considerably. Of course, the four lines or furrows represented stand symbolically for a plurality of identical structures. The subsequent lines or furrows 9″ on the right than prefer the −3 and the 30 5 diffraction orders. Further on the right is a part 9 ‴, which symmetrically accentuates for example the ±10 orders. The structure 9 ‴ finally prefers for example the ± 3 orders. The row 10, the line structure 10′ of which beginning from the right prefers initially for example the ±15 orders, contains a similar sequence.

As clearly shown, graduation sections disposed side by side according to line or column are designed differently in their line structure. As modifications of the embodiments shown, gratings may be designed with different line structures arranged according to a code in several lines side by side.

It is also possible, as a modification of the arrangement shown in FIG. 2c so to design such a diffraction grating arrangement with different line structures in mutually adjoining graduation sections, that measurements according to at least two intersecting co-ordinate directions are possible.

A grating with pyramidal diffracting elements such as shown in FIG. 2d can also be used for this purpose.

As evident from the above description, the described apparatus can be used as a photo-electric step marker for length or angle measurement, using a diffraction grating as a measure of distance, diffraction orders being brought to interference in sets of two for the generation of periodic signals.

The described apparatus can thus comprise a step marker improved in respect of accuracy of interpolation and signal quality, by the particular construction of the diffraction grating employed.

What we claim is:

1. In an apparatus having a diffraction grating suitable for measuring a property of movement of said grating relative to a beam of radiation with reference to at least one coordinate axis and defining at least one set of two diffraction orders, means to cause radiation of one of the diffraction orders of one set to interfere with the radiations of the other one of the diffraction orders of the respective set, and detecting means receiving the radiation of said interfering diffraction orders and generating electric signals indicative of the property of movement, the improvement comprising:
   said diffraction grating having a uniform line geometry and a plurality of sections with groove geometry varied irregularly by section defining at least one set of two diffraction orders other than the zero diffraction order and energetically preferred to all the other diffraction orders.

2. Apparatus as claimed in claim 1, wherein the modulus of each of the two order numbers of one set of diffraction orders is at least equal to 3.

3. Apparatus as claimed in claim 1, wherein the order numbers of the two diffraction orders of one set have the same modulus and mutually opposite sign.

4. Apparatus including a diffraction grating comprising a plurality of pyramidal diffracting elements suitable for measuring a property of movement of the grating relative to a beam of radiation with reference to at least one coordinate axis, the grating defining at least one set of two diffraction orders other than the zero diffraction order, which are energetically preferred to other diffraction orders, wherein the improvement comprises:
   a. means for causing radiation of one of the diffraction orders of one set to interfere with radiation of the other one of the diffraction orders of the respective set; and
   b. detecting means to receive said interfering radiation and to generate electric signals indicative of the property of movement.

5. Apparatus as claimed in claim 4, wherein the grating defines at least one individual set of two preferred diffraction orders associated with each respective one of a plurality of co-ordinate axes, the order numbers of the preferred diffraction orders associated with each individual co-ordinate axis being different from the order numbers of the diffraction orders associated with the or each respective other co-ordinate axis.

6. In an apparatus having a diffraction grating suitable for measuring a property of movement of said grating relative to a beam of radiation with reference to at least one coordinate axis and defining at least one set of two diffraction orders, means to cause radiation of one of the diffraction orders of one set to interfere with the radiations of the other one of the diffraction orders of the respective set, and detecting means receiving the radiation of said interfering diffraction orders and generating electric signals indicative of the property of movement, the improvement comprising:
   said diffraction grating having a line geometry defining at least one set of two diffraction orders other than the zero diffraction order and energetically preferred to all the other diffraction orders, said diffraction grating having a uniform grating constant over the whole of the surface of said grating, individual portions of said surface of said grating defining respectively different sets of two preferred diffraction orders associated with the same coordinate axis.

* * * * *